United States Patent [19]

Muskat et al.

[11] Patent Number: 4,901,807

[45] Date of Patent: Feb. 20, 1990

[54] COMBINATION WEIGHER WITH MULTIPLE COMPARTMENT WEIGHING RECEPTACLES

[75] Inventors: Robert L. Muskat, Lake Forest; Robert H. Connors, Chicago; King Klopfenstein, Prospect Heights, all of Ill.

[73] Assignee: Triangle Package Machinery, Chicago, Ill.

[21] Appl. No.: 926,005

[22] Filed: Oct. 31, 1986

[51] Int. Cl.$^4$ ............................................. G01G 13/00
[52] U.S. Cl. .................................. 177/25.18; 177/199
[58] Field of Search ................... 177/1, 50, 25.18, 199

[56] References Cited

U.S. PATENT DOCUMENTS

| | | | |
|---|---|---|---|
| 4,137,976 | 2/1979 | Grayson, Jr. ...................... | 177/50 X |
| 4,538,693 | 9/1985 | Klopfenstein et al. ............ | 177/59 X |
| 4,616,722 | 10/1986 | Moran ........................... | 177/25.18 X |
| 4,618,011 | 10/1986 | Sashiki et al. ................. | 177/25.18 X |

Primary Examiner—George H. Miller, Jr.

Attorney, Agent, or Firm—Neuman, Williams, Anderson & Olson

[57] ABSTRACT

A weighing machine that accepts product from a source, segregates it into discrete quantities, and combines a number of the discrete quantities into a group that closely approximates a target weight. The machine includes a feeder means that transports product from the source; a plurality of accumulating means which receive product from the feeder means and discharge discrete quantities of product therefrom in a plurality of selected directions; a plurality of weighing means having multiple compartment which receive product from the accumulating means into the multiple compartments and determine the weight of product in each individual compartment; and collecting means to receive product from the multiple compartment weighing means, consolidate it and direct it to another location. By using multiple compartment weighing receptacles, each containing a determined weight of product, the required number of weighing means is advantageously reduced and storage hoppers are not needed.

4 Claims, 4 Drawing Sheets

COMBINATION WEIGHER WITH MULTIPLE COMPARTMENT WEIGHING RECEPTACLES

FIELD OF THE INVENTION

This invention relates generally to a machine for providing, from a variety of product sources, including a bulk supply, a continuum of discrete quantities of product with each quantity having a predetermined target weight, or a weight very close thereto. More particularly, the invention is an improvement and simplification of known combination weighing apparatus, which improvement utilizes multiple compartment weighing receptacles.

BACKGROUND OF THE INVENTION

The combination weigher with multiple compartment weighing receptacles of the present invention is an improvement and simplification of the weighing machine described and claimed in commonly owned U.S. Pat. No. 4,538,693, the specification and drawings of which are incorporated herein by reference.

Recent combination weighers have used a series of bins or hoppers to collect product from a continuous product supply and to convert that product flow into a series of discrete product groups that are each deposited onto a scale and weighed. Preferably, each discrete product group weighs a fraction of the target weight so that a number of them must be combined to obtain the package weight. For instance, if the target weight is 100 grams, the weighing machine might create ten discrete fractional weight groups, each having an arbitrary weight between approximately 10 grams and 30 grams. The machine considers the possible fractional weight combinations available by combining the discrete product groups and it selects the combination providing the preferred weight.

The number of fractional weight groups available on any particular machine cycle is important to machine performance. The larger this number, the greater the possibility of finding a combination exactly equal to the preferred weight.

Many combination weighing machines require one scale for each fractional weight group, for example prior art U.S. Pat. No. 3,939,928 to Murakami or U.S. Pat. No. 4,618,011 to Sashiki. In such weighing machines, all available fractional weight groups are not used on each machine cycle; typically about half these groups remain unused. Therefore, the average number of scales used each machine cycle is only approximately half the existing scales.

The scales are an expensive machine component; thus some attempts have been made to reduce the number of scales without a corresponding reduction in available fractional weight groups. For example, see prior art U.S. Pat. Nos. 4,618,012 to Yamano et al., 4,614,243 to Ikeda, 4,560,015 to Minamida, and 4,538,693 to Klopfenstein et al., all of which utilize storage hoppers. These storage hoppers contain fractional weight groups whose weight was determined on a previous scale cycle but which were not then used, and which are available on a present machine cycle. Consequently the available fractional weight groups are increased without a corresponding increase in number of scales; or, conversely stated, an appropriate number of fractional weight groups may be maintained with fewer scales. These storage hoppers have disadvantages, however; they increase overall machine height, provide additional surfaces for product sticking and/or breakage and present a manufacturing cost.

The present invention provides an appropriate number of available fractional weight groups, but with a smaller number of scales and without storage hoppers.

SUMMARY OF THE INVENTION

Accordingly, it is an object of the present invention to provide an improved and simplified combination weighing machine.

It is a further object of the present invention to provide two or more available fractional weight groups per scale without the use and disadvantages of storage hoppers.

It is a further object of the present invention to provide a more compact combination weighing machine which maintains accuracy and reliability at a lower cost.

It is a further object of the present invention to provide an improved weighing machine which operates with less breakage of fragile product than previous weighing machines.

It is a further object of the present invention to provide an improved weighing machine with fewer parts that is easier to maintain and clean, and that requires fewer machine settings and adjustments.

These and other objects of the invention will be apparent hereinafter from the specification, which describes the best mode of practicing the invention as currently known and a preferred embodiment. Reference should also be made to the drawings, which constitute a part of the disclosure, and the subject matter claimed.

Generally, the objects of the present invention are accomplished by a combination weighing machine equipped with multiple compartment weighing receptacles to produce a quantity of product having a predetermined weight. The present invention is a two-stage machine which essentially consists of a plurality of accumulators, each having multiple discharge doors, and a plurality of multiple compartment weighing receptacles, with each compartment having a separate discharge door. The utilization of such multiple compartment weighing receptacles eliminates the need for at least the holding means of the '693 apparatus.

In operation of the preferred embodiment of the present invention, a feeder means supplies product from a source. Multiple accumulator means receive the product from the feeder means and selectively discharge discrete amounts therefrom through one of two selected discharge doors on each accumulator means. A plurality of two compartment weighing means, one for each accumulator means, receives the discrete product amounts from the accumulator means, weighs them, and discharges the product through the discharge doors of a pre-selected group of weighing means. Collecting means receives the product from one or more of the two compartment weighing means, consolidates it, and directs it to another location.

The present invention reduces the number of parts in the combination weigher, the manufacturing costs thereof, the overall machine height and the number of items to be maintained and cleaned—all without adversely affecting the accuracy of the weighing machine.

DESCRIPTION OF THE DRAWINGS

FIG. 7 is a fragmentary view showing a multiple compartment weighing receptacle which is positionable below a stationary accumulating chamber to permit the deposit of product from the accumulating chamber into a selected compartment of the weighing receptacle.

DESCRIPTION OF THE ILLUSTRATED EMBODIMENTS

Figures 1, 2:
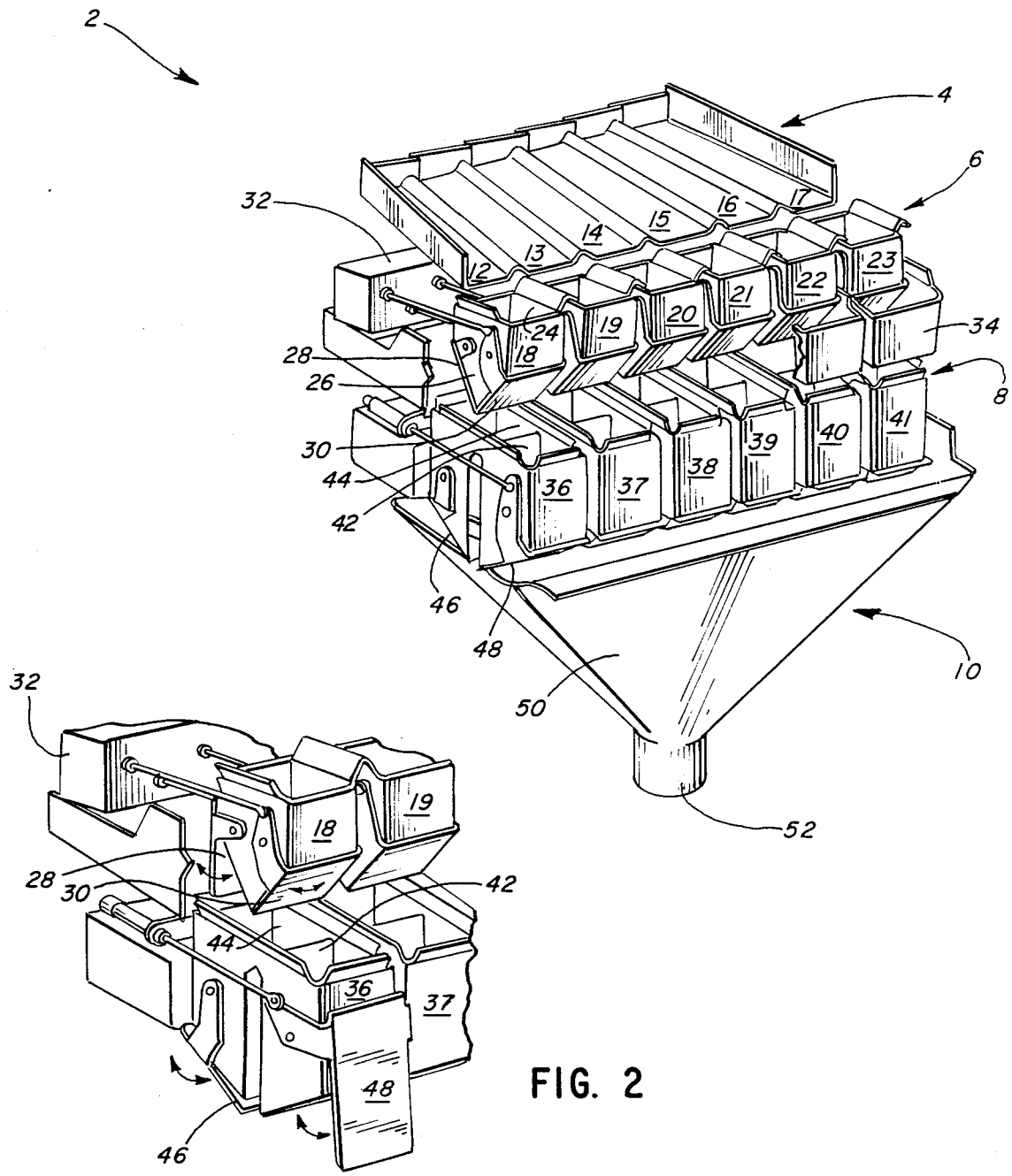
FIG. 1 is a perspective view of the preferred embodiment of the present invention.
FIG. 2 is a fragmentary view showing the accumulators and two compartment weighing receptacles of the embodiment shown in FIG. 1.

Referring now to FIGS. 1 and 2, and using like numerals to designate like items, a preferred embodiment of the present invention for a weighing machine 2 is shown. In major sections it includes, moving in the direction of product flow, an in-line feeder means 4, a side by side row of accumulating means 6, a side by side row of weighing means 8, and a collecting means 10. The necessary frame, support, and operational or control means have been omitted in all figures for clarity, as it would be clear to one skilled in the art how to incorporate the unillustrated features. In addition, most of the operating mechanisms are easily observed from the front of the machine, and all of the operating mechanisms of the same type can be observed from a single side view of the machine.

The in-line feeder means 4 can take one of several forms known in the art. Conventional vibrating means (not shown) are attached and the amplitude and frequency of operation may be adjusted or altered as necessary or desirable to regulate the rate of product flow or to accommodate product having different handling characteristics. In the illustrated embodiment, a supply of product is segregated into six controlled product feeds through six channels 12-17.

The row of accumulating means 6 receives product from the superposed feeder means 4. The row of accumulating means 6 comprises a side-by-side row of six accumulators having bucket-like chambers 18-23 that are fixed to the frame of the weighing machine and disposed immediately below the discharge ends of the respective individual trays 12-17 of the feeder means 4. There is preferably one accumulator for each individual channel of the feeder means 4. Each accumulating chamber, such as 18, has the shape of a hollow, generally pentagonal prism, with the top portion 24 being open to permit product to fall thereinto from its respective superposed feed channel; i.e., feed channel 12.

In the preferred embodiment, each accumulator chamber has, on its bottom portion 26, two independently operable bottom opening doors that are hinged on opposite sides thereof. Thus, accumulator chamber 18, for example, has bottom opening doors 28 and 30.

The doors are selectively operable through a mechanical or electromechanical device 32 to open and close independently to discharge product from the accumulating chamber in opposite directions, thereby permitting the product deposited therein to flow downwardly to a selected compartment of a corresponding two compartment weighing receptacle in the row of weighing means 8. A dual action pneumatic cylinder, electrical solenoid, or the like is suitable, with rods or other attachments to connect it to the doors 28 and 30. Spring return air cylinders can also be used for this application. Each individual door opens or remains in its normally closed position in response to downstream demands for product. It will be appreciated that other than opposed, bottom opening doors may be used; front opening doors, side opening doors or paddle arrangements may be utilized to effect the selective discharge of product to a desired location. In the illustrated embodiment, a shroud 34 may be employed to facilitate product flow out of the accumulators and into the desired weighing buckets.

The row of weighing means 8 receives product from the superposed row of accumulating means 6, and determines the weight of each discrete amount of product deposited therein. The row of weighing means 8 comprises a side-by-side row of six scales with bucket-like chambers, i.e., weigh buckets 36-41. Each weighing receptacle, or weigh bucket, is divided into two individual compartments. Thus, weight bucket 36, for example, is divided into forward compartment 42 and rear compartment 44. Each individual compartment of each weigh bucket is opened at the top to permit product to fall thereinto from its respective accumulator chamber door. For example, rear accumulator door 28 of accumulator 18, shown as open in FIG. 2, feeds product into individual rear weigh bucket compartment 44. Front accumulator door 30 of accumulator 18 feeds product into individual front weigh bucket compartment 42. Each weigh bucket is individually supported by a weight sensing means by a connecting cantilevered arm or the like (not shown). The weight sensing means may be a load cell, balanced mass weigh cell, or a spring balanced weigh cell.

The weigh buckets have a configuration similar to that of each accumulator chamber, including an open top portion and a bottom portion with two opening doors, rear door 46 and front door 48 on weigh bucket 36, for example. One door corresponds to each individual compartment of the weigh buckets 36-41. Each weigh bucket door is operatively attached to the machine for selective opening and closing, independently of the other door of the same weigh bucket and the other doors of the other weigh buckets, to release the product held therein. Each weigh bucket door opens or remains in its normally closed position in response to downstream demands for product.

The collecting means 10 receives product from any of the superposed individual weigh bucket compartments. It comprises a funnel-like chute portion 50 having an upper or mouth section that encompasses all of the weigh bucket compartments of weighing means 8. The funnel-like chute 50 tapers to a common feed tube 52 that consolidates the product released by the various weigh bucket compartments and directs or conveys it to another location, such as a packaging machine or other filling apparatus.

Figure 3:
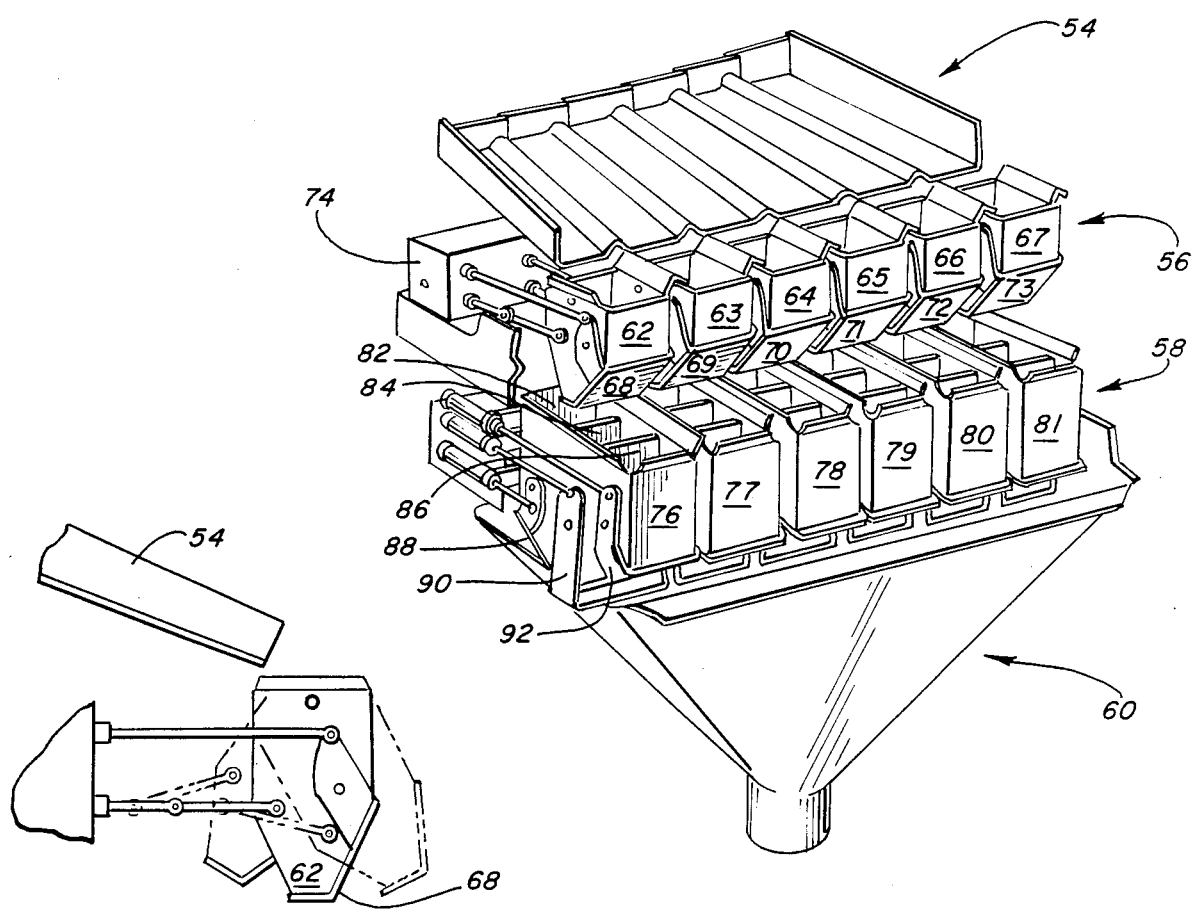
FIG. 3 is a perspective view of an alternate embodiment of the present invention.
Figure 4:
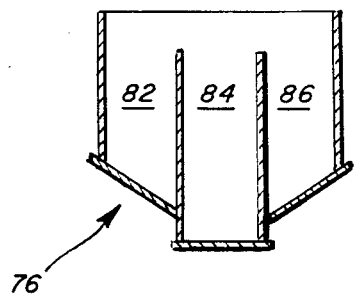
FIG. 4 is a fragmentary view showing the pivotally mounted accumulators and multiple compartment weighing receptacles of the embodiment shown in FIG. 3.

FIGS. 3 and 4 illustrate an alternate embodiment of the present invention. In major sections it includes, moving in the direction of product flow, an in-line feeder means 54, a side-by-side row of accumulating means 56 pivotally mounted to selectively channel product discharge in one of a plurality of directions, a side-by-side row of multiple compartment weighing means 58 and a collecting means 60. The necessary frame, support and operational or control means have been omitted in both figures for clarity, as it would be clear to one skilled in the art how to incorporate the unillustrated features.

The alternate embodiment illustrated in FIGS. 3 and 4 operates on many of the same principles as previously described in connection with FIGS. 1 and 2. It also includes many of the same structural features, such as the feeder means 54 that converts a product source into six channels of controlled product flow; the collecting means 60; and the weight sensing and operational control means. The operation of the alternate embodiment differs in that it is not limited to use with two compartment weigh buckets. Pivotally mounted accumulators, each having a single door, can be selectively positioned to channel product flow into any one of a number of separate compartments in a weigh bucket disposed thereinbelow.

The row of accumulating means 56 receives product from the superposed feeder means 54. The row of accumulating means comprises a side-by-side row of six pivotally mounted accumulators 62-67, having separate bottom opening doors 68-73, respectively. Doors 68-73 are operable through a mechanical or electromechanical device 74 to open and close independently to discharge product from the accumulating chambers when the chambers are selectively positioned with respect to the weigh bucket compartment desired to receive product. Thus, this design effectively combines the functions of the accumulators with the function of a product feed divertor and, further, enables the use of multiple compartment weigh buckets having more than two compartments.

The row of weighing means 58 receives product from the superposed row of accumulating means 56, and determines the weight of each discrete amount of product deposited therein. The row of weighing means 58 comprises a side-by-side row of six weigh buckets 76-81, each divided into three separate compartments. For example, weigh bucket 76 is divided into compartments 82, 84 and 86. Accumulator 62 may be positioned to unload product from its door 68 into either of compartments 82, 84 or 86 of weigh bucket 76. Once the product weights are determined and the requisite calculations made, selected weigh bucket bottom opening doors are independently opened to release product to the collecting means 60. FIG. 3 shows a suitable mechanism for hinging and operating three doors 88, 90 and 92 corresponding to the three compartments 82, 84 and 86 of weigh bucket 76. Doors 88, 90 and 92 are operable through suitable mechanical or electrical devices to open and close independently and to discharge selected weigh bucket chambers.

Figure 5:
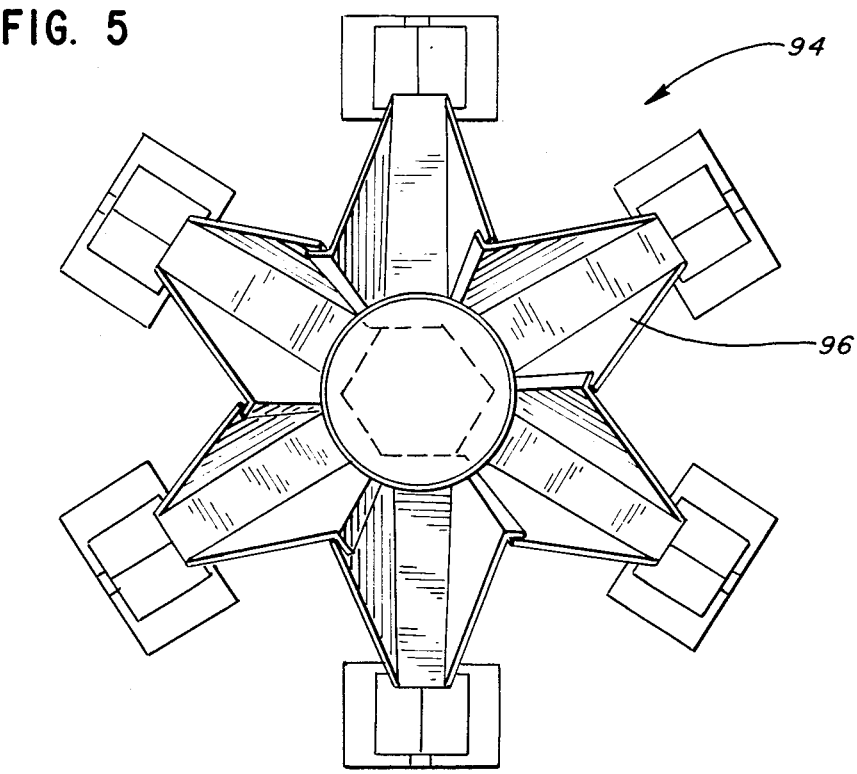
FIG. 5 is a perspective view of the present invention as shown in a radial feed machine.
Figure 6:
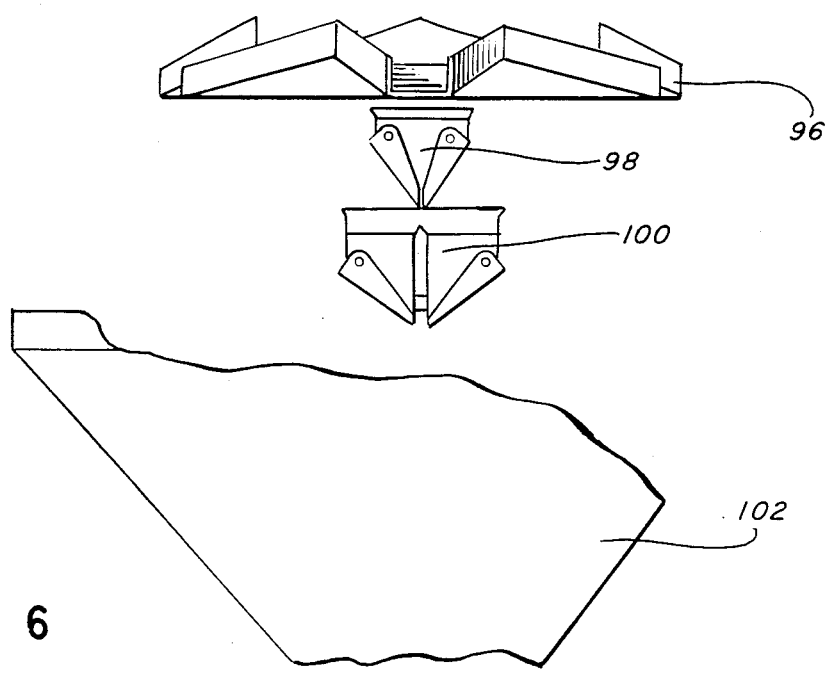
FIG. 6 is a fragmentary view showing the accumulators and multiple compartment weighing receptacles of the embodiment shown in FIG. 5.

FIGS. 5 and 6 illustrate an alternate embodiment of the present invention, i.e., the application of the multiple compartment weighing receptacle of the present invention to a radial feed machine 94 as opposed to the in-line or linear feed machine of FIGS. 1-4. In major sections it includes a radial array of feeder means 96, each having disposed below the discharge ends thereof: a double door accumulator 98 to receive the product from the feeder means and selectively discharge such product through one of its two discharge doors; a two compartment weigh bucket 100 to receive the product discharged from the accumulator 98, weigh it and discharge it through one of the two pre-selected discharge doors; and collecting means 102 to receive the product from the accumulators of the radial feed machine 94, consolidate it and direct it to another location.

Other embodiments of the present invention will be recognized by those skilled in the art. For example, where there is no need to interrupt continuous product flow by accumulating product, the product accumulators may be substituted with divertors which direct product from the feeder means to selected multiple compartment weighing receptacles. This result is achieved, in the operation of the embodiment shown in FIGS. 3 and 4 by locking the accumulator doors in the open position. Indeed, certain products can be sufficiently controlled and directed by the feeder means so as to eliminate the necessity of accumulators or separate divertors at all. Additionally, the objects of the present invention may be achieved by utilizing multiple compartment weighing receptacles which are pivotally or otherwise positionably mounted so that selective movement aligns a preferred weighing receptacle compartment with the discharge of a stationary feed channel, an accumulator or a divertor Such an embodiment of the present invention is shown in FIG. 7. Alternatively, one may wish to utilize both divertors accumulators in combination with the multiple compartment weighing receptacles of the present invention in a particular application.

As will be appreciated in the art, a variety of microprocessor and other peripheral equipment and discrete logic systems can be used in the operation of the aforediscussed apparatus to achieve the objective of segregating a bulk supply of product into quantities achieving a target weight. Particular reference should be made to the specification of U.S. Pat. No. 4,538,693 at Cols. 9-13. The operation of the present invention differs principally insofar as its use of multiple, as opposed to single, compartment weigh buckets necessitates that the weight determining operation proceed in a different manner. In the preferred operation, the weight value of product portion added to one of the compartments is obtained by taking the difference in the weight signals as obtained before the individual product portion, was added to the weigh bucket and after that product portion was added. More specifically, the logic system employed will compute the weight of the product in the last individual compartment to receive a discrete amount of product by subtracting the weight of the other filled compartments of the same weighing receptacle from the new total weight. Other logic systems are within the scope of the present invention. For example, the weight of the product in the last individual compartment to receive product can also be deduced by knowing the previous and new total weights and the weight of product discharged from the receptacle during the previous machine cycle. It will be appreciated that the filling of the individual compartments may be a complete or only a partial filling. The principles of operation of the claimed combination weigher are the same regardless of the amount of product added to the chambers.

Due to the novel use of multiple compartment weigh buckets, and the consequential reduction in the number of parts and stages of product transfer, the apparatus of the present invention is less costly to manufacture and maintain, easier to clean and advantageously adapted for use with fragile products.

It is believed that the embodiments herein illustrated and described accomplish all of the above enumerated objects and have made apparent a number of modifications which can be made in the invention disclosed, by those having the benefit of the foregoing teachings, without departing from the spirit and scope of this invention.

What is claimed is:

1. A weighing machine for providing a quantity of product having a predetermined weight, comprising:
    feeder means to transport product supplied by a product source;
    a plurality of accumulating means to receive product from said feeder means, hold said product and selectively discharge said product therefrom, said accumulating means including an accumulating chamber pivotally mounted to selectively channel said product discharge in one of a plurality of directions, a door in said accumulating chamber to discharge product therefrom and a door operating means to selectively open and close said door;
    a plurality of weighing means, each comprising a multiple compartment weighing receptacle, to receive discrete amounts of product from said feeder means, and a weight determining means to determine the weight of the product in each compartment of each said weighing receptacle; and
    collecting means to receive discrete amounts of product from any of said weighing means, consolidate them, and direct them to another location.

2. A weighing machine for providing a quantity of product having a predetermined weight, comprising:
    feeder means to transport product supplied by a product source;
    a plurality of weighing means, each comprising a multiple compartment weighing receptacle, to receive discrete amounts of product from said feeder means, and a weight determining means to determine the weight of the product in each compartment of each said weighing receptacle, each of said multiple compartment weighing receptacles being positionable to receive product into a selected compartment thereof; and
    collecting means to receive discrete amounts of product from any of said weighing means, consolidate them, and direct them to another location.

3. A weighing machine for providing a quantity of product having a predetermined weight, comprising:
    feeder means to transport product supplied by a product source;
    a plurality of accumulating means to receive product from said feeder means, hold said product and selectively discharge discrete amounts of product therefrom, each of said accumulating means comprising an accumulating chamber which is pivotally mounted to receive product and to selectively channel said product discharge in one of a plurality of directions, a door to discharge product from said accumulating chamber and a door operating means to selectively open and close said door;
    a plurality of weighing means to receive discrete amounts of product from said accumulating means, determine the weights thereof, and selectively discharge said product, each of said weighing means comprising a multiple compartment weighing receptacle to receive product in its individual compartments;
    weight determining means within said weighing means, including weight sensing means and means for computing the weight of the product in the last individual compartment to receive a discrete amount of product by subtracting the weight of the other filled compartments of the same weighing receptacle from the new total weight; and
    collecting means to receive discrete amounts of product from any of said weighing means, consolidate them, and direct them to another location.

4. A weighing machine for providing a quantity of product having a predetermined weight, comprising:
    feeder means to transport product supplied by a product source;
    a plurality of accumulating means to receive product from said feeder means, hold said product and discharge said product therefrom;
    a plurality of weighing means, each comprising a multiple compartment weighing receptacle, to receive discrete amounts of product from said feeder means, and a weight determining means to determine the weight of the product in each compartment of said weighing receptacle, each of said multiple compartment weighing receptacles being positionable to receive product into a selected compartment thereof; and
    collecting means to receive discrete amounts of product from any of said weighing means, consolidate them, and direct them to another location.

* * * * *